United States Patent [19]

Bauer

[11] Patent Number: 5,120,616
[45] Date of Patent: Jun. 9, 1992

[54] PROCESS FOR THE DISPOSAL OF STORAGE CELLS

[75] Inventor: Roland Bauer, Hemsbach, Fed. Rep. of Germany

[73] Assignee: Asea Brown Boveri AG, Mannheim, Fed. Rep. of Germany

[21] Appl. No.: 568,368

[22] Filed: Aug. 16, 1990

[30] Foreign Application Priority Data

Aug. 18, 1989 [DE] Fed. Rep. of Germany ....... 3927225

[51] Int. Cl.$^5$ .......................................... H04M 10/54
[52] U.S. Cl. ........................................ 429/49; 429/104
[58] Field of Search .................................. 429/49, 104

[56] References Cited

U.S. PATENT DOCUMENTS 4,839,248  6/1989  Magnussen et al. .................. 429/49
4,956,246  9/1990  Kamuf et al. ........................ 429/104
5,015,541  5/1991  Evans .................................... 429/49

Primary Examiner—Stephen Kalafut
Attorney, Agent, or Firm—Herbert L. Lerner; Laurence A. Greenberg

[57] ABSTRACT

A process for the disposal of rechargeable storage cells based on sodium and sulphur includes embedding each storage cell in a wax-like, solid material and then opening the storage cells. After opening, the sodium is first removed from the storage cell. Subsequently, the storage cell is opened further, and reaction products, a second reactant and components of the storage cell are taken out for re-utilization or processing to form waste materials that are free of pollutants and capable of disposal.

14 Claims, 1 Drawing Sheet

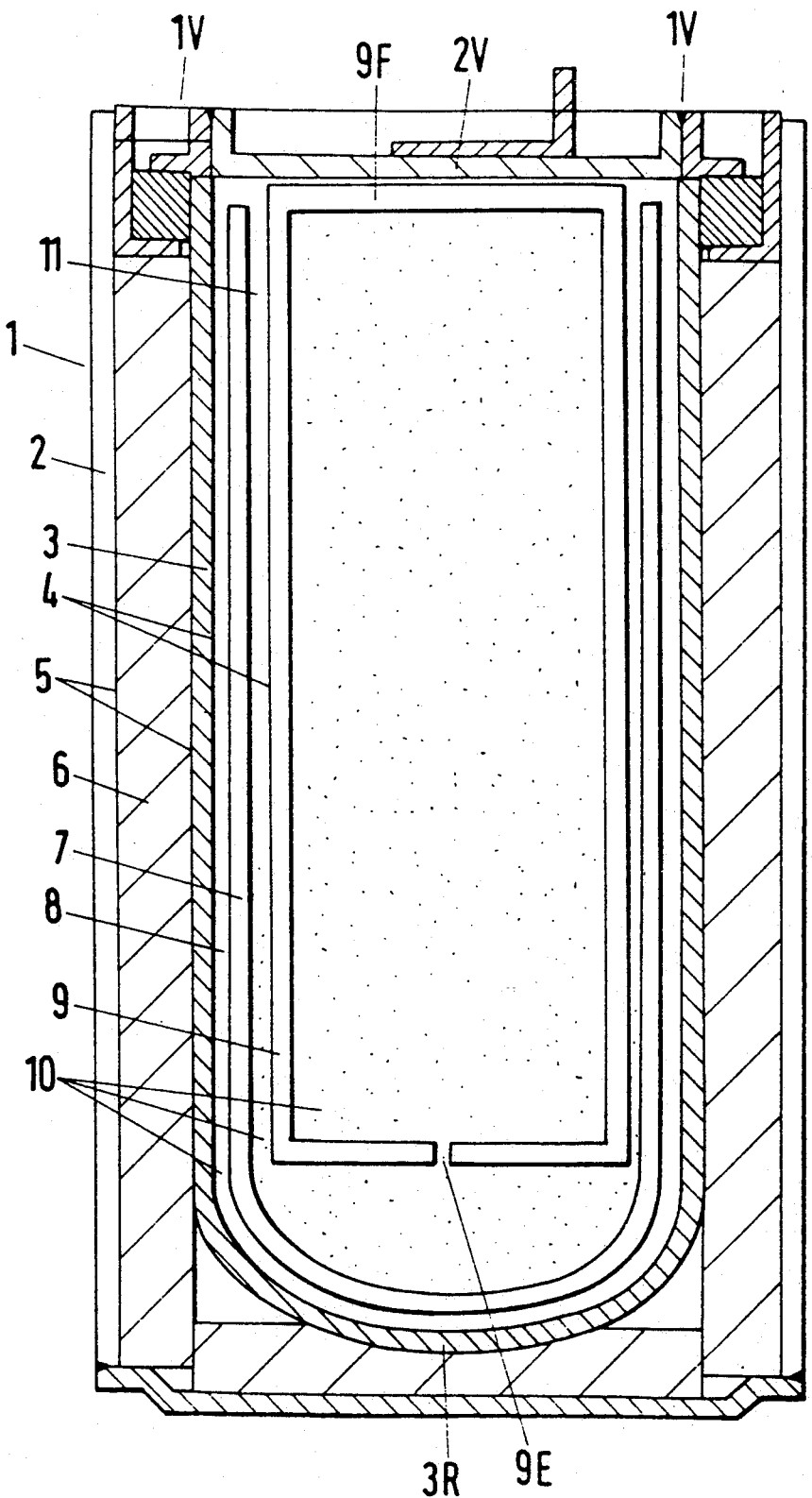

PROCESS FOR THE DISPOSAL OF STORAGE CELLS

The invention relates to a process for the disposal of storage cells based on sodium and sulphur, having an anode chamber, a cathode chamber for receiving a sulphur electrode, a solid electrolyte separating the chambers from each other and conducting alkali metal ions, a metallic casing bounding regions of the chambers, and a sodium-containing cartridge and a safety vessel inside the solid electrolyte defining sodium-containing gaps.

Such a process is applied, for example, wherever storage cells from high-temperature storage batteries are no longer in use for reasons of age and have to be disposed of. The measures known to date for disposing of storage cells are unsatisfactory, since they give rise to harmful waste products whose final deposition is connected with high costs.

It is accordingly an object of the invention to provide a process for the disposal of storage cells, which overcomes the hereinafore-mentioned disadvantages of the heretoforeknown methods of this general type and with which rechargeable storage cells can be disposed of in such a way that all components, reactants and reaction products can be virtually entirely re-utilized.

With the foregoing and other objects in view there is provided, in accordance with the invention, a process for the disposal of storage cells based on sodium and sulphur, the storage cells having an anode chamber, a cathode chamber for receiving a sulphur electrode, and components including a solid electrolyte separating the chambers from each other and conducting alkali ions, a metallic casing bounding regions of the chambers, and a sodium-containing cartridge and a safety vessel inside the solid electrolyte being spaced apart from each other and from the solid electrolyte defining sodium-containing gaps therebetween, and the process comprises initially removing the sodium and subsequently removing reaction products and the components from the storage cell, and feeding or transporting the sodium, the reaction products and the components for re-use, preparation or processing into waste materials which are to be stored or deposited and are free of pollutants or harmful substances.

The dismantling of the storage cells can be carried out without a blanketing gas. Regardless of the state of charge of the particular storage cells, they can all be disposed of in the same way by the process according to the invention. It is also possible to dispose of storage cells in which the solid electrolytes have cracks.

In accordance with another mode of the invention wherein the storage cell has a cap plate in a cap region, there is provided a process which comprises initially embedding the storage cell in a wax-like material, and subsequently boring an opening in the cap plate corresponding to the diameter of the safety vessel.

In accordance with a further mode of the invention, there is provided a process which comprises placing the storage cell with the opening pointing downwards in a liquefied, wax-like material being heated to substantially between 110° C. and 150° C., and fusing and subsequently removing the sodium from the cartridge, the safety vessel and the gaps.

The opening of storage cells is carried out safely, because the storage cells are embedded in advance in a wax-like material, preferably paraffin.

In accordance with an added mode of the invention, there is provided a process which comprises embedding the storage cell in the wax-like material in the form of solid paraffin with the longitudinal axis of the storage cell in a horizontal plane for opening the cap plate, placing the storage cell in a paraffin bath being heated to substantially between 110° C. and 115° C. after opening, and forcing out liquid sodium with an overpressure generated in the cartridge.

The fusing of the sodium which is carried out in a paraffin bath, is at a temperature below the melting point of sulphur. Exothermal reactions with the liquid sodium occur only in a very weakened form, and remain locally limited.

In accordance with an additional mode of the invention, there is provided a process which comprises removing, cleaning and taking the cartridge and the safety vessel from the storage cell to a metal smelter, after complete removal of the sodium.

In accordance with yet another mode of the invention, there is provided a process which comprises collecting the sodium on the floor of a vessel containing the wax-like material in the form of liquid paraffin, subsequently solidifying the sodium under a blanketing gas, separating the sodium from paraffin carried along with the sodium and borings, and subsequently re-using the sodium to fill new storage cells.

In accordance with yet a further mode of the invention, there is provided a process which comprises subsequent to the step of removing the sodium, subdividing the metallic casing into two halves having longitudinal axes extending parallel to the longitudinal axis of the storage cell, separating the two halves of the casing from a sulphur electrode, cleaning the two halves in an alcohol bath, and subsequently producing new casings from the two halves.

It is therefore seen that after the removal of the sodium from each storage cell, the casing material and the sulphur electrode can be separated from one another, cleaned and subsequently treated, all in a simple way.

With the process according to the invention, the storage cells can be disposed of in such a way that approximately 70% by weight of the total storage cell material can be reused in the production of new storage cells. The remaining material can be used to produce other products, or be deposited in a pollutant-free fashion. In particular, 7 to 5% by weight of the sodium, which is taken from a storage cell, can be used for filling new storage cells. 10.5% by weight of the highgrade steel of the storage cell can be subsequently treated as steel scrap. 27% by weight of the aluminum alloy can be reused in re-fusing processes. 25% by weight of the sodium polysulphides and of the elemental sulphur can be extracted from the granules, into which the sulphur electrode material is processed. These materials can be used to produce sulphur dyes. 26% by weight of the bonded joints, of the extracted ceramic scrap and of the graphite felt are waste materials that are free from pollutants and capable of disposal.

In accordance with yet an added mode of the invention, there is provided a process which comprises processing the solid electrolyte with an adhering sulphur electrode to form granules with a grain size of substantially from 5 to 10 mm, and separating off bonded joints and a floor of the storage cell.

In accordance with yet an additional mode of the invention, there is provided a process which comprises thermally roasting the granules in a fluidized-bed furnace, and recovering sulphuric acid and re-utilizable building materials.

Through thermal disposal of the granules produced from the sulphur electrode, it is possible for even 97% by weight of the storage cell material to be reused. Remains of adhering sodium or sodium polysulphide must be dissolved by wet chemical means.

In accordance with again another mode of the invention, there is provided a process which comprises subsequently treating the granules to form disposable ceramic scrap and basic material for sulphur dyes.

In accordance with a concomitant mode of the invention, there is provided a process which comprises processing excess $Na_2S_x$ solutions to form disposable neutral salts, sulphur and re-utilizable materials.

Other features which are considered as characteristic for the invention are set forth in the appended claims.

Although the invention is illustrated and described herein as embodied in a process for the disposal of storage cells, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific embodiments when read in connection with the accompanying drawing.

The drawing is a diagrammatic, longitudinal-sectional view of a storage cell with which the process according to the invention will be explained in more detail below.

Referring now in detail to the single figure of the drawing, there is seen a storage cell 1, which is bounded towards the outside by a casing 2 made of light metal. The storage cell 1 is constructed in the shape of a cup and made from aluminum in the illustrative embodiment represented in this case. A solid electrolyte 3 which conducts alkali metal ions, is also constructed in the shape of a cup and is made from beta aluminum oxide. The interior of the solid electrolyte 3 serves as an anode chamber or compartment 4. The anode chamber 4 has dimensions which are chosen in such a way that a continuous interspace remains between the anode chamber 4 and the casing 2. The continuous interspace serves as a cathode compartment 5, in which a sulphur electrode 6 is disposed. Disposed inside the anode chamber 4 is a safety vessel 7, which is constructed in the shape of a cup. The dimensions of the vessel 7 are chosen in such a way that a very narrow gap 8 remains between the outer surfaces of the vessel 7 and the inner surfaces of the solid electrolyte 3. Disposed inside the safety vessel 7 is a cartridge 9 which contains sodium 10. The cartridge 9 has a first end disposed opposite a rounded end 3R of the solid electrolyte 3. The first end of the cartridge 9 has an opening 9E formed therein, through which the sodium 10 can flow into the safety vessel 7. The dimensions of the cartridge 9 are chosen in such a way that a gap 11 remains between the outer surface thereof and the inner surface of the safety vessel 7. The sodium 10 issuing from the cartridge 9 flows into the gap 11. Due to an overpressure which prevails inside the cartridge 9, sodium 10 rises up inside the gap 11 as far as the upper open end of the safety vessel 7, and since the safety vessel 7 is open in a cap region IV of the storage cell, it flows into the gap 8, which is provided between the safety vessel 7 and the solid electrolyte 3.

In order to dispose of the storage cell 1 in accordance with the process according to the invention, the storage cell 1 is embedded in non-illustrated paraffin and it is subsequently opened in the cap region IV. During this process, a cap plate 2V and an end surface 9F of the cartridge 9 are bored. During the opening, the storage cell 1 is in the horizontal position and is thus completely surrounded by paraffin. The opening in the cap plate 2V is enlarged to such an extent that it corresponds to the diameter of the safety vessel 7. The storage cell 1 is subsequently disposed in a non-illustrated vessel containing paraffin which is heated to a temperature of between 110° C. and 115° C. The storage cell 1 is disposed in the paraffin in such a way that the non-illustrated opening that was just made points downwards. During a residence time of approximately 30 minutes in the heated paraffin, the sodium 10 of the storage cell 1 is liquefied, and can then be taken from the opened cartridge 9. In order to be able to completely remove the sodium from the cartridge 9 in a simple way it is possible, for example, to place a non-illustrated riser tube which reaches up to the opening 9E, inside the cartridge 9. Nitrogen can be introduced through the riser tube into the cartridge 9, in order to generate an overpressure there. The sodium 10 can be forced out of the cartridge 9 with the aid of the overpressure.

The sodium 10 from the cartridge 9 and the gap 11 is collected on the floor of the vessel, in which the liquid paraffin is located. The cartridge 9 is subsequently removed from the storage cell 1. The same holds true for the safety vessel 7. The sodium which is inside the gap 8 is likewise removed from the storage cell 1, and collected together with the remaining sodium on the floor of the vessel, in which the storage cell is located at that moment. The removal of the cartridge 9 and of the safety vessel 7 is carried out with non-illustrated special tools, which enable the parts to be taken from the storage cell 1 in a simple fashion. After cleaning in alcohol, they are taken to a metal smelter. The sodium removed from the storage cell 1 can be solidified under a blanketing gas. After removal of impurities in the form of paraffin and borings, the sodium can be used to fill new storage cells. After the complete removal of the sodium from the storage cell 1 and from the gap 8, the metallic casing 2 is subdivided into two halves, and more precisely in such a way that the longitudinal axes of these halves extend parallel to the longitudinal axis of the storage cell 1. The two halves of the casing 2 are separated from the sulphur electrode 6, and taken from the paraffin bath. After cleaning in a non-illustrated alcohol bath, they can be reused to produce new casings 2. The solid electrolyte 3 with the adhering sulphur electrode 6 is processed to form granules with a grain size of 5 to 10 mm. The granules can subsequently be thermally treated by roasting in such a way that it subsequently becomes possible for sulphuric acid and waste products that are free of pollutants to be recovered therefrom for final deposition or storage or for subsequent treatment. On the other hand, there is the possibility of leaching the granules by means of water, and of filtering off the ceramic material that is capable of disposal. This gives rise to solutions containing sodium polysulphide. Excess sulphur can be dissolved by the addition of a caustic soda solution. The concentration and stoichiometry of these solutions can be adjusted by the addition of a caustic soda solution or elemental sulphur in such a way that they are suitable for subsequent treatment to form sulphur dyes in the chemical industry. Furthermore, there is the possibility of disposing of excess solutions containing sodium polysulphide by oxidative neutralization with bleaching liquor. This gives rise to neutral salts that are capable of disposal and sulphur as a recycling product.

The process steps explained above are all capable of being automated. For example, the storage cells can be transported by a conveyor belt from magazines in which they are stored to the paraffin, embedded automatically therein, and opened with the aid of a boring device in the manner described above. The storage cells can be subsequently and likewise automatically disposed with the opening that wa formed pointing downwards in a vessel filled with hot paraffin. The removal of the sodium, the cartridges and the safety vessel from the storage cells can also be automated. The separated cartridges and safety vessels and the sodium-free storage cells, can be taken from the hot paraffin, which is at a temperature of 110° C. to 115° C. with the aid of a device, and fed to an alcohol bath for cleaning. Depending upon the size of the automation equipment, 30 or more storage cells can be disposed of per hour.

I claim:

1. Process for the disposal of storage cells based on sodium and sulphur, the storage cells having an anode chamber, a cathode chamber for receiving a sulphur electrode, and components including a solid electrolyte separating the chambers from each other and conducting alkali metal ions, a metallic casing bounding regions of the chambers, and a sodium-containing cartridge and a safety vessel inside the solid electrolyte being spaced apart from each other and from the solid electrolyte defining sodium-containing gaps therebetween, and the process comprises initially removing the sodium and subsequently removing reaction products and the components from the storage cell, and re-using or processing the sodium, the reaction products and the components into pollutant-free storable waste materials.

2. Process according to claim 1, wherein the storage cell has a cap plate in a cap region, and the process further comprises initially embedding the storage cell in a wax-like material, and subsequently boring an opening in the cap plate corresponding to the diameter of the safety vessel.

3. Process according to claim 2, which comprises placing the storage cell with the opening pointing downwards in a liquefied, wax-like material being heated to substantially between 110° C. and 150° C., and fusing and subsequently removing the sodium from the cartridge, the safety vessel and the gaps.

4. Process according to claim 2, which comprises embedding the storage cell in the wax-like material in the form of solid paraffin with the longitudinal axis of the storage cell in a horizontal plane for opening the cap plate, placing the storage cell in a paraffin bath being heated to substantially between 110° C. and 115° C. after opening, and forcing out liquid sodium with an overpressure generated in the cartridge.

5. Process according to claim 3, which comprises embedding the storage cell in the wax-like material in the form of solid paraffin with the longitudinal axis of the storage cell in a horizontal plane for opening the cap plate, placing the storage cell in a paraffin bath being heated to substantially between 110° C. and 115° C. after opening, and forcing out liquid sodium with an overpressure generated in the cartridge.

6. Process according to claim 1, which comprises completely removing the sodium, and subsequently removing, cleaning and taking the cartridge and the safety vessel from the storage cell to a metal smelter for processing.

7. Process according to claim 2, which comprises collecting the sodium on the floor of a vessel containing the wax-like material in the form of liquid paraffin, subsequently solidifying the sodium under a blanketing gas, separating the sodium from paraffin carried along with the sodium and borings, and subsequently re-using the sodium to fill new storage cells.

8. Process according to claim 4, which comprises collecting the sodium on the floor of a vessel containing the wax-like material in the form of liquid paraffin, subsequently solidifying the sodium under a blanketing gas, separating the sodium from paraffin carried along with the sodium and borings, and subsequently re-using the sodium to fill new storage cells.

9. Process according to claim 1, which comprises subsequent to the step of removing the sodium, subdividing the metallic casing into two halves having longitudinal axes extending parallel to the longitudinal axis of the storage cell, separating the two halves of the casing from a sulphur electrode, cleaning the two halves in an alcohol bath, and subsequently producing new casings from the two halves.

10. Process according to claim 1, which comprises processing the solid electrolyte with an adhering sulphur electrode to form granules with a grain size of substantially from 5 to 10 mm, and separating off bonded joints and a floor of the storage cell.

11. Process according to claim 10, which comprises thermally roasting the granules in a fluidized-bed furnace, and recovering sulphuric acid and re-utilizable building materials.

12. Process according to claim 10, which comprises subsequently treating the granules to form disposable ceramic scrap and basic material for sulphur dyes.

13. Process according to claim 11, which comprises processing excess $Na_2S_x$ solutions to form disposable neutral salts and re-utilizable materials.

14. Process according to claim 11, which comprises processing excess $Na_2S_x$ solutions to form sulphur.

* * * * *